(12) United States Patent
Koshima et al.

(10) Patent No.: US 11,706,855 B2
(45) Date of Patent: Jul. 18, 2023

(54) LIGHT EMITTING ELEMENT DRIVING DEVICE FOR PREVENTING THAT OVERCURRENT FLOWS THROUGH LIGHT EMITTING ELEMENT

(71) Applicant: PFU LIMITED, Kahoku (JP)

(72) Inventors: Shumpei Koshima, Kahoku (JP); Masaaki Sakai, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/806,639

(22) Filed: Jun. 13, 2022

(65) Prior Publication Data

US 2023/0020031 A1 Jan. 19, 2023

(30) Foreign Application Priority Data

Jul. 15, 2021 (JP) ................... 2021-117115

(51) Int. Cl.
*H05B 45/345* (2020.01)
*G02F 1/13357* (2006.01)

(52) U.S. Cl.
CPC ......... *H05B 45/345* (2020.01); *G02F 1/1336* (2013.01)

(58) Field of Classification Search
CPC ...... H05B 45/10; H05B 45/30; H05B 45/345; H05B 47/10; G02F 1/1336
See application file for complete search history.

(56) References Cited

U.S. PATENT DOCUMENTS

| 8,669,934 B2 * | 3/2014 | Sasaki | H05B 45/46 345/102 |
| 10,548,192 B2 | 1/2020 | Muramatsu et al. | |
| 2016/0330806 A1 * | 11/2016 | Yamashita | H05B 45/325 |

FOREIGN PATENT DOCUMENTS

JP 2019-47095 A 3/2019

\* cited by examiner

*Primary Examiner* — Jimmy T Vu
(74) *Attorney, Agent, or Firm* — Lewis Roca Rothgerber Christie LLP

(57) ABSTRACT

A light emitting element driving device includes a light emitting element to emit light in response to a supply of a first current, a first switching element to turn ON/OFF the first current supplied to the light emitting element, a second switching element to turn ON/OFF a second current not supplied to the light emitting element, a constant current circuit to adjust a total current amount of the first current and the second current to be constant, and a control circuit. The control circuit turns ON the first switching element in a state of flowing the second current to the second switching element by turning ON the second switching element, and after turning ON the first switching element, flows the first current to the light emitting element and the first switching element by turning OFF the second switching element.

6 Claims, 10 Drawing Sheets

LIGHT EMITTING ELEMENT DRIVING DEVICE FOR PREVENTING THAT OVERCURRENT FLOWS THROUGH LIGHT EMITTING ELEMENT

CROSS-REFERENCE TO RELATED APPLICATIONS

This application is based upon and claims the benefit of priority of prior Japanese Patent Application No. 2021-117115, filed on Jul. 15, 2021, the entire contents of which are incorporated herein by reference.

TECHNICAL FIELD

Embodiments discussed in the present specification relate to turning on a light.

BACKGROUND

Recently, an image reading apparatus, such as a scanner, to image a medium while conveying the medium or moving an imaging device, is required to image the medium at a higher speed. Such an image reading apparatus is provided with, for example, a light emitting element driving device to emit light having each RGB color to the medium, and an imaging device to image the medium in which light is emitted by a light emitting element. In order to image the medium at a high speed, the image reading apparatus needs to switch the color of the light emitted to the medium at a high speed by the light emitting element driving device.

The light emitting element driving device, for example, switches the turning on/turning off of each light emitting element, by connecting a switching element to the light emitting element to emit light having each RGB color, and a constant current circuit, and switching ON/OFF of each switching element. In the light emitting element driving device, overcurrent may flow through the light emitting element at the timing of turning on the light emitting element by switching the switching element from OFF to ON. When the overcurrent flows through the light emitting element, the amount of the light of the light emitting element may be too large, or the light emitting element may fail.

A light emitting element driving device including a constant current circuit for supplying a constant current to a light emitting portion, a main switching element inserted in series between the light emitting portion and the constant current circuit, and a sub-switching element connected to a node between the switching element and the constant current circuit is disclosed (see Japanese Unexamined Patent Publication No. 2019-47095). The light emitting element driving device flows a constant current to the constant current circuit through the sub-switching element by turning on the sub-switching element before turning on the main switching element, and turns off the sub-switching element at the same time as turning on the main switching element.

SUMMARY

According to some embodiments, a light emitting element driving device includes a light emitting element to emit light in response to a supply of a first current, a first switching element to turn ON/OFF the first current supplied to the light emitting element, a second switching element to turn ON/OFF a second current not supplied to the light emitting element, a constant current circuit to adjust a total current amount of the first current and the second current to be constant, and a control circuit to control turning ON/OFF by the first switching element and the second switching element. The control circuit turns ON the first switching element in a state of flowing the second current to the second switching element by turning ON the second switching element, and after turning ON the first switching element, flows the first current to the light emitting element and the first switching element by turning OFF the second switching element.

According to some embodiments, an image reading apparatus includes an imaging sensor to image a medium, and a plurality of light emitting devices to emit light having different colors to the medium, respectively. Each of the plurality of light emitting devices includes a light emitting element to emit light in response to a supply of a first current, a first switching element to turn ON/OFF the first current supplied to the light emitting element, a second switching element to turn ON/OFF a second current not supplied to the light emitting element, a constant current circuit to adjust a total current amount of the first current and the second current to be constant, and a control circuit to control turning ON/OFF by the first switching element and the second switching element. The control circuit turns ON the first switching element in a state of flowing the second current to the second switching element by turning ON the second switching element, and after turning ON the first switching element, flows the first current to the light emitting element and the first switching element by turning OFF the second switching element.

BRIEF DESCRIPTION OF DRAWINGS

FIG. 4 illustrates an example of a circuit diagram of a red light emitting device 131a.

DESCRIPTION OF EMBODIMENTS

It is to be understood that both the foregoing general description and the following detailed description are exemplary and explanatory, and are not restrictive of the invention, as claimed.

Hereinafter, a light emitting element driving device and an information processing apparatus according to an embodiment, will be described with reference to the drawings. However, it should be noted that the technical scope of the invention is not limited to these embodiments, and extends to the inventions described in the claims and their equivalents.

Figure 1:
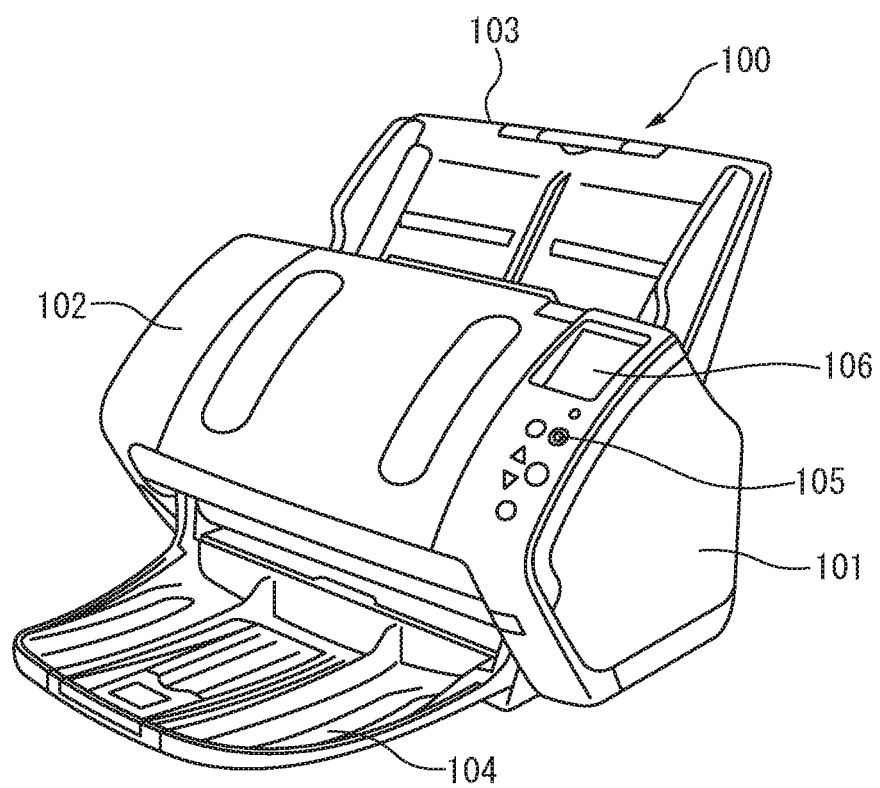
FIG. 1 is a perspective view illustrating an image reading apparatus 100 according to an embodiment.

FIG. 1 is a perspective view illustrating an image reading apparatus 100 according to an embodiment.

The image reading apparatus 100 is, for example, an image scanner, etc. The image reading apparatus 100 conveys and images a medium being a document. A medium is a paper, a thick paper, a card, a brochure, a passport, etc. The image reading apparatus 100 may be a facsimile, a copying machine, a printer multifunction machine (MFP, Multifunction Peripheral), etc.

The image reading apparatus 100 includes a lower housing 101, an upper housing 102, a medium tray 103, an ejection tray 104, an operation device 105 and a display device 106, etc.

The upper housing 102 is located at a position covering the upper surface of the image reading apparatus 100 and is engaged with the lower housing 101 by hinges so as to be opened and closed at a time of medium jam, during cleaning the inside of the image reading apparatus 100, etc.

The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
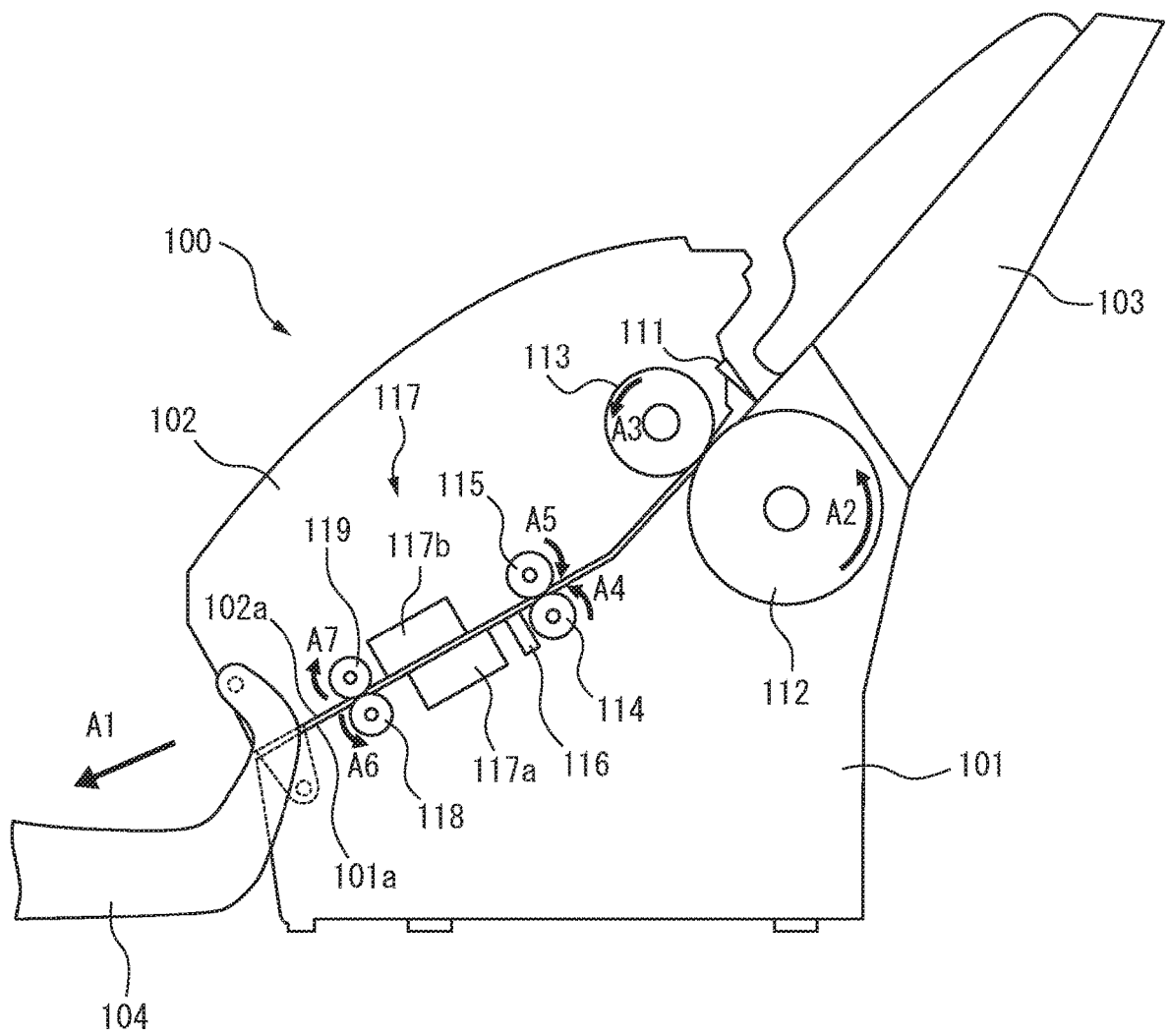
FIG. 2 is a diagram for illustrating a conveyance path inside the image reading apparatus 100.

FIG. 2 is a diagram for illustrating a conveyance path inside the image reading apparatus 100.

The conveyance path inside the image reading apparatus 100 includes a first medium sensor 111, a feed roller 112, a separation roller 113, a first conveyance roller 114, a second conveyance roller 115, a second medium sensor 116, an imaging device 117, a first ejection roller 118, a second ejection roller 119, etc. The number of each roller is not limited to one, and may be plural. In that case, the rollers are located apart from each other along in a width direction perpendicular to the medium conveying direction A1, respectively. The imaging device 117 includes a first imaging device 117a and a second imaging device 117b located to face each other with the medium conveyance path in between.

A top surface of the lower housing 101 forms a lower guide 101a of a conveyance path of a medium, and a bottom surface of the upper housing 102 forms an upper guide 101b of the conveyance path of a medium. An arrow A1 in FIG. 2 indicates a medium conveying direction. Hereinafter, an upstream refers to an upstream in the medium conveying direction A1, and a downstream refers to a downstream in the medium conveying direction A1.

The first medium sensor 111 is located on the upstream side of the feed roller 112 and the separation roller 113. The first medium sensor 111 includes a contact detection sensor and detects whether or not a medium is placed on the medium tray 103. The first medium sensor 111 generates and outputs a first medium signal of which the signal value changes between a state in which a medium is placed on the medium tray 103 and a state in which a medium is not placed. The first medium sensor 111 is not limited to the contact detection sensor, and any other sensor, such as a light detection sensor, capable of detecting the presence or absence of the medium may be used as the first sensor 111.

The feed roller 112 is provided on the lower housing 101 and sequentially feeds media placed on the medium tray 103 from the lower side. The separation roller 113 is a so-called brake roller or retard roller, is provided on the upper housing 102, and is located to face the feed roller 112.

The first conveyance roller 114 and the second conveyance roller 115 are located on the downstream side of the feed roller 112, to face each other, to convey the medium fed by the feed roller 112 and the separation roller 113 to the imaging device 117.

The second medium sensor 116 is located on the downstream side of the first conveyance roller 114 and on the upstream side of the imaging device 117, to detect the medium conveyed to the position. The second medium sensor 116 includes a light emitter and a light receiver provided on one side (e.g., the lower housing 101) with respect to a medium conveyance path, and a light guide provided at a position (e.g., the upper housing 102) facing the light emitter and the light receiver across the medium conveyance path. The light emitter is a light emitting diode (LED), etc., and emits light toward the medium conveyance path. The light receiver is a photodiode, etc., and receives the light emitted by the light emitter, and guided by the light guide. When the medium is present at a position facing the second medium sensor 116, the light receiver does not detect the light emitted from the light emitter since the light emitted from the light emitter is shielded by the medium. The light receiver generates and outputs a second medium signal of which signal value changes between a state in which a medium exists at a position of the second medium sensor 116 and a state in which a medium does not exist at the position, based on an intensity of the received light.

A reflecting member such as a mirror may be used, Instead of the light guide. Further, the light emitter and the light receiver may be provided to face each other across the medium conveyance path. The second medium sensor 116 may detect the presence of the medium by a contact detection sensor, etc., to pass a predetermined current when a medium is in contact or a medium is not in contact.

The first ejection roller 118 and the second ejection roller 119 are located on the downstream side of the imaging device 117, to face each other, to convey the medium conveyed by the first conveyance roller 114 and the second conveyance roller 115, and imaged by the imaging device 117, and eject it to the ejection tray 104.

A medium placed on the medium tray 103 is conveyed between the lower guide 101a and the upper guide 101b in the medium conveying direction A1 by the feed roller 112 rotating in a direction of an arrow A2 in FIG. 2, that is, a medium feeding direction. When the medium is conveyed, the separation roller 113 rotates in a direction of an arrow A3, i.e., a direction opposite to the medium feeding direction. By the workings of the feed roller 112 and the separation roller 113, when a plurality of media are placed on the medium tray 103, only the media in contact with the feed roller 112, out of the media placed on the medium tray 103, is separated. Consequently, the medium conveying apparatus 100 operates in such a way that conveyance of a medium other than the separated medium is restricted (prevention of multi-feed).

The medium is fed between the first conveyance roller 114 and the second conveyance roller 115 while being guided by the lower guide 101a and the upper guide 101b. The medium is fed between the first imaging device 114a and the second imaging device 114b by the first conveyance roller 114 and the second conveyance roller 115 rotating in directions of an arrow A4 and an arrow A5, respectively. The medium read by the imaging device 117 is ejected onto the ejection tray 104 by the first ejection roller 118 and the second ejection roller 119 rotating in directions of an arrow A15 and an arrow A16, respectively. Thus, the feed roller 112, the separation roller 113, the first conveyance roller 114, the second conveyance roller 115, the first ejection roller 118 and/or the second ejection roller 119 functions as a conveying module to convey the medium.

Figure 3:
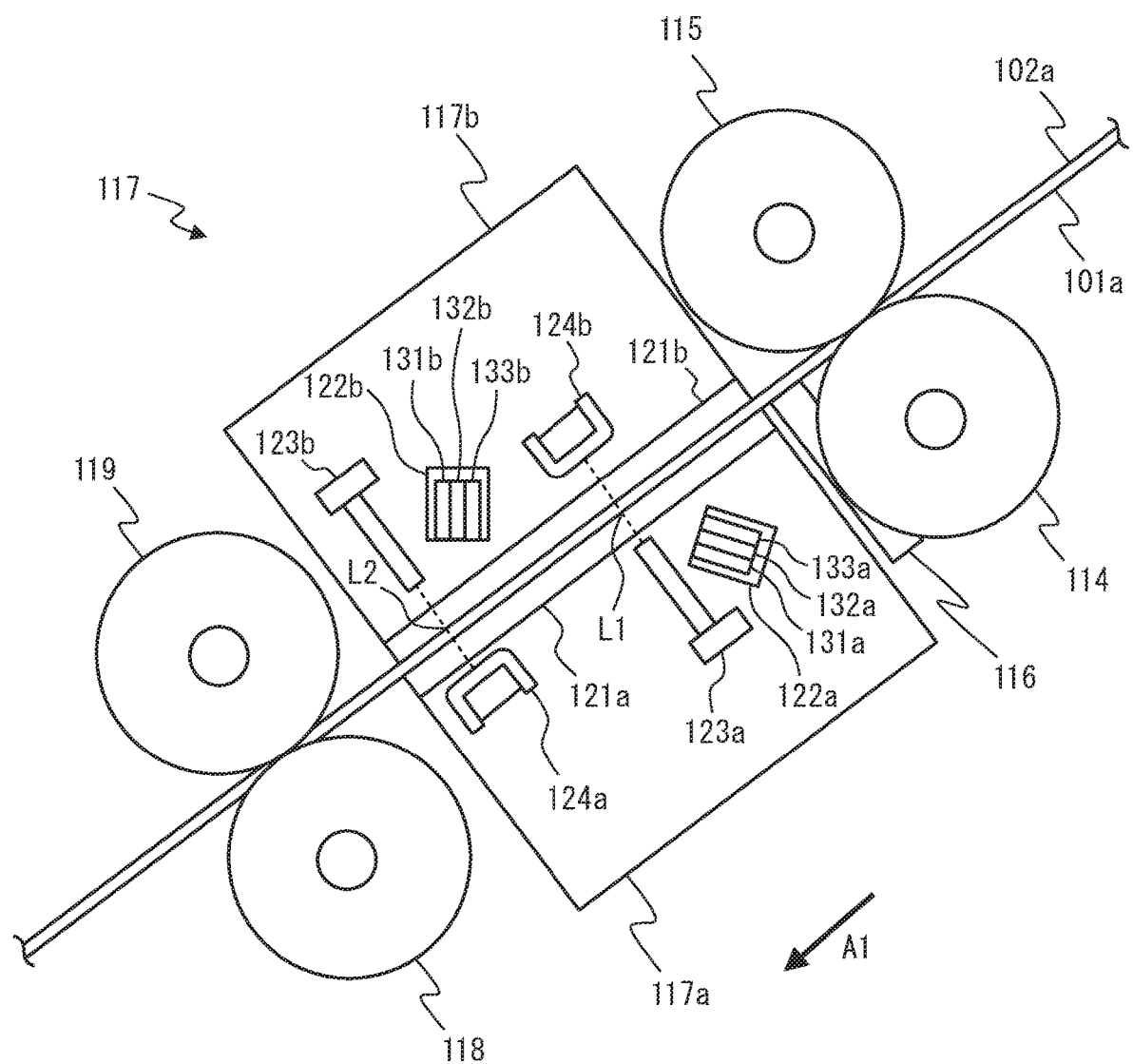
FIG. 3 is a diagram for illustrating an imaging device 117.

FIG. 3 is a diagram for illustrating the imaging device 117.

As shown in FIG. 3, the second imaging device 117b is located above the first imaging device 117a, to face the first imaging device 117a. The first imaging device 117a includes a first light transmitting member 121a, a first light emitting device 122a, a first imaging sensor 123a and a first backing member 124a, etc. The second imaging device 117b includes a second light transmitting member 121b, a second light emitting device 122b, a second imaging sensor 123b and a second backing member 124b, etc.

The first light transmitting member 121a and the second light transmitting member 121b are formed of transparent glass. The first light transmitting member 121a and the second light transmitting member 121b may be formed of transparent plastic, etc.

The first light emitting device 122a is provided on the opposite side of the second backing member 124b with the first light transmitting member 121a and the second light transmitting member 121b in between. The first light emitting device 122a is a light source to emit light to the conveyed medium, and includes a red light emitting device 131a, a green light emitting device 132a and a blue light emitting device 133a. The red light emitting device 131a, the green light emitting device 132a and the blue light emitting device 133a are examples of a light emitting element driving device or a light emitting device, respectively, and emit red, green and blue light to the medium conveyed by the conveying module, respectively. That is, the first light emitting device 122a includes a plurality of light emitting devices to emit light having different colors to the conveyed medium, respectively. The first light emitting device 122a emits light toward the front surface of the medium conveyed to the position of the imaging device 117 i.e., the second backing member 124b of the second imaging device 117b facing when the medium is not conveyed.

Similarly, the second light emitting device 122b is provided on the opposite side of the first backing member 124a with the second light transmitting member 121b and the first light transmitting member 121a in between. The second light emitting device 122b is a light source to emit light to the conveyed medium, and includes a red light emitting device 131b, a green light emitting device 132b and a blue light emitting device 133b. The red light emitting device 131b, the green light emitting device 132b and the blue light emitting device 133b are examples of the light emitting element driving device or the light emitting device, respectively, and emit red, green and blue light to the medium conveyed by the conveying module, respectively. That is, the second light emitting device 122b includes a plurality of light emitting devices to emit light having different colors to the conveyed medium, respectively. The second light emitting device 122b emits light toward the back surface of the medium conveyed to the position of the imaging device 117, i.e., the first backing member 124a of the first imaging device 117a facing when the medium is not conveyed.

The first imaging sensor 123a is an example of an imaging sensor, and is provided on the opposite side of the second backing member 124b with the first light transmitting member 121a and the second light transmitting member 121b in between. The first imaging sensor 123a includes a line sensor based on a unity-magnification optical system type contact image sensor (CIS) including an imaging element based on a complementary metal oxide semiconductor (CMOS) linearly located in a main scanning direction. Each imaging element outputs an electrical signal having a signal value corresponding to each RGB color. Further, the first imaging sensor 123a includes a lens for forming an image on the imaging element, and an A/D converter for amplifying and analog-digital (A/D) converting an electric signal output from the imaging element. The first imaging sensor 123a images the front surface of the medium conveyed by the conveying module at the imaging position L1, and generates an input image.

Similarly, the second imaging sensor 123b is an example of an imaging sensor, and is provided on the opposite side of the first backing member 124a with the first light transmitting member 121a and the second light transmitting member 121b in between. The second imaging sensor 123b includes a line sensor based on a unity-magnification optical system type CIS including an imaging element based on a CMOS linearly located in a main scanning direction. Each imaging element outputs an electrical signal having a signal value corresponding to each RGB color. Further, the second imaging sensor 123b includes a lens for forming an image on the imaging element, and an A/D converter for amplifying and A/D converting an electric signal output from the imaging element. The second imaging sensor 123b images the back surface of the medium conveyed by the conveying module at the imaging position L2, and generates an input image.

The first imaging sensor 123a and the second imaging sensor 123b are one-line monochrome sensors, and identify component values of each RGB color of an object to be imaged while switching colors of light emitted by the first light emitting device 122a and the second light emitting device 122b. A one-line monochrome sensor is less expensive than a three-line color sensor including three line sensors corresponding to each RGB color, and can reduce the amount of color shift. Therefore, the image reading apparatus 100 can reduce the apparatus cost and suppress the occurrence of the color shift in the input image, by using the one-line monochrome sensors as the first imaging sensor 123a and the second imaging sensor 123b.

A line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs. In addition, any one of the set of the first light emitting device 122a, the first imaging sensor 123a and the second backing member 124b, or the set of the second light emitting device 122b, the second imaging sensor 123b and the first backing member 124a may be omitted.

The first backing member 124a is provided below the first light transmitting member 121a and at a position facing the second light emitting device 122b and the second imaging sensor 123b. The surface facing the second imaging sensor 123b in the first backing member 124a has, for example, white, and the first backing member 124a functions as a white reference member for the correcting, such as shading, of an image based on an image signal in which the first backing member 124a is imaged.

Similarly, the second backing member 124b is provided above the second light transmitting member 121b and at a position facing the first light emitting device 122a and the first imaging sensor 123a. The surface facing the first imaging sensor 123a in the second backing member 124b has, for example, white, and the second backing member 124b functions as a white reference member for the correcting, such as shading, of an image based on an image signal in which the second backing member 124b is imaged.

Hereinafter, the first light emitting device 122a and the second light emitting device 122b may be collectively referred to as light emitting devices 122. The first imaging sensor 123a and the second imaging sensor 123b may be collectively referred to as imaging sensors 123.

Figure 4:
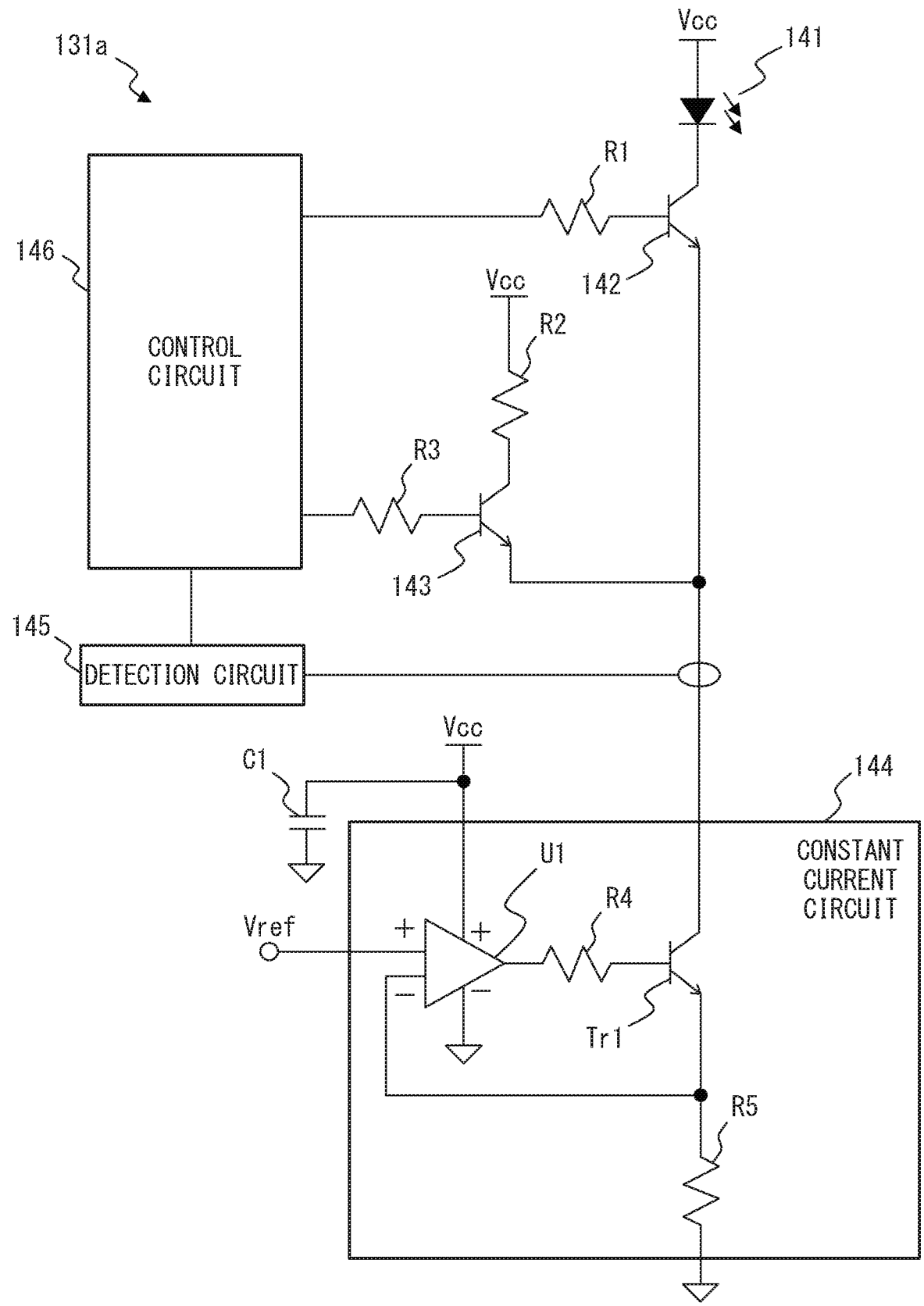

FIG. 4 shows an example of a circuit diagram of the red light emitting device 131a of the first light emitting device 122a.

As shown in FIG. 4, the red light emitting device 131a includes a light emitting element 141, a first switching element 142, a second switching element 143, a constant current circuit 144, a detection circuit 145 and a control circuit 146, etc.

The light emitting element 141 is connected between a power supply voltage Vcc and the constant current circuit 144. That is, the light emitting element 141 is connected in series to the constant current circuit 144. The input terminal of the light emitting element 141 is connected to the power supply voltage Vcc, and the output terminal of the light emitting element 141 is connected to the first switching element 142. The light emitting element 141 is, for example, a red LED, and emits light having a red to the conveyed medium. The light emitting element 141 emits light in response to a supply of a current supplied to the light emitting element 141. As the amount of the current supplied to the light emitting element 141 is large, the amount of the light emitted by the light emitting element 141 is large. As the amount of the current supplied to the light emitting element 141 is small, the amount of light emitted by the light emitting element 141 is small. Hereinafter, the current supplied to the light emitting element 141 is referred to as a first current.

The first switching element 142 is connected between the light emitting element 141 and the constant current circuit 144. That is, the first switching element 142 is connected in series to the light emitting element 141 and the constant current circuit 144. The first switching element 142 is, for example, an NPN type transistor. The collector terminal is connected to the output terminal of the light emitting element 141, the emitter terminal is connected to the input terminal of the constant current circuit 144, and the base terminal is connected to the control circuit 146 via a resistor R1. The first switching element 142 turn ON/OFF the first current supplied to the light emitting element 141, according to a first control signal input from the control circuit 146. When a signal value of the first control signal is equal to or more than a predetermined threshold, the first switching element 142 is set to ON, and flows the first current from the power supply voltage Vcc to the constant current circuit 144 via the first switching element 142, to flow the first current to the light emitting element 141. On the other hand, when the signal value of the first control signal is less than the predetermined threshold, the first switching element 142 is set to OFF, and does not flow the first current to the light emitting element 141 by stopping the first current from the power supply voltage Vcc to the constant current circuit 144 via the first switching element 142. The first switching element 142 may be set so that the amount of the current between the collector and the emitter when set to ON is equal to or less than the rated current of the light emitting element 141.

The second switching element 143 is connected between the power supply voltage Vcc and the constant current circuit 144 so as to be connected in parallel to the first switching element 142. That is, the second switching element 143 is connected in series to the power supply voltage Vcc and the constant current circuit 144. The second switching element 143 is, for example, an NPN type transistor. The collector terminal is connected to the power supply voltage Vcc via a resistor R2, the emitter terminal is connected to the input terminal of the constant current circuit 144, and the base terminal is connected to the control circuit 146 via a resistor R3. The second switching element 143 turns ON/OFF a current supplied to the second switching element according to a second control signal input from the control circuit 146. Hereinafter, the current supplied to the second switching element, i.e. the current not supplied to the light emitting element 141 may be referred to as a second current. When a signal value of the second control signal is equal to or more than the predetermined threshold, the second switching element 143 is set to ON, and flows the second current from the power supply voltage Vcc to the constant current circuit 144 via the second switching element 143. On the other hand, when the signal value of the second control signal is less than the predetermined threshold, the second switching element 143 is set to OFF, and stops the second current from the power supply voltage Vcc to the constant current circuit 144 via the second switching element 143.

The input terminal of the constant current circuit 144 is connected to the emitter terminal of the first switching element 142 and the second switching element 143. The constant current circuit 144 includes an operational amplifier U1, a transistor Tr1 and resistors R4, R5. The positive power supply terminal of the operational amplifier U1 is connected to the power supply voltage Vcc, and the negative power supply terminal of the operational amplifier U1 is connected to ground. A capacitor C1 for preventing fluctuations in the power supply voltage is connected between ground and a connection path of the positive power supply terminal and the power supply voltage Vcc. The non-inverting input terminal of the operational amplifier U1 is connected to the reference voltage Vref, the inverting input terminal of the operational amplifier U1 is connected to the emitter terminal of the transistor T1, the output terminal of the operational amplifier U1 is connected to the base terminal of the transistor Tr via a resistor R4. The transistor Tr is, for example, an NPN-type transistor. The collector terminal is connected to the input terminal of the constant current circuit 144, the emitter terminal is connected to ground via a resistor R5, the base terminal is connected to the output terminal of the operational amplifier U1 via the resistor R4. The positive power supply terminal of the operational amplifier U1 is not limited to be connected to the power supply voltage Vcc, and may be connected to any power supply voltage different from Vcc.

The operational amplifier U1 operates so that the potential of the emitter terminal of the transistor Tr is equal to the output potential of the reference voltage Vref. Thus, the constant current circuit 144 maintains the amount of the current flowing from the collector terminal to the emitter terminal of the transistor Tr constant, and flows a steady constant current to the input terminal connected to the first switching element 142 and the second switching element 143. That is, the constant current circuit 144 adjusts a total current amount of the first current supplied to the light emitting element 141 and the second current not supplied to the light emitting element 141 to be constant. The constant current circuit 144 is set so that the total current amount of the first current supplied from the power supply voltage Vcc via the first switching element 142 and the second current supplied from the power supply voltage Vcc via the second switching element 143, does not exceed the rated current of the light emitting element 141.

The detection circuit 145 is connected to the constant current circuit 144 and the control circuit 146. The detection circuit 145 is a current sensor. The detection circuit 145 detects the amount of the current supplied to the input terminal of the constant current circuit 144. The detection circuit 145 generates a detection signal of which signal value changes depending on whether or not the detected amount of the current is equal to or more than a threshold, and outputs it to the control circuit 146. The threshold is set to, for example, the rated current of the light emitting element 141. The threshold may be set to the rated current of the first switching element 142. Further, the detection circuit 145 may detect the amount of the current, by measuring the emitter current, the base current, the emitter potential and the base potential of the transistor Tr to convert them the amount of the current supplied to the input terminal of the constant current circuit 144. The detector 145 is, for example, an analog front end (AFE). An application specific integrated circuit (ASIC), a digital signal processor (DSP), a large scale integration (LSI), a field-programmable gate array (FPGA), etc., may be used as the detecting circuit 145.

The control circuit 146 is connected to the base terminal of the first switching element 142 via the resistor R1, and controls turning ON/OFF by the first switching element 142. Further, the control circuit 146 is connected to the base terminal of the second switching element 143 via the resistor R3, and controls turning ON/OFF by the second switching element 143. The control circuit 146 is connected to the detection circuit 145 controls turning ON/OFF by the first switching element 142 and the second switching element 143, according to the detection signal from the detection circuit 145. The control circuit 146 switches ON/OFF of the first switching element 142, by generating a first control signal of which signal value varies between H value being equal to or more than a predetermined threshold and L value being less than the predetermined threshold, and outputting it to the base terminal of the first switching element 142. Further, the control circuit 146 switches ON/OFF of the second switching element 143, by generating a first control signal of which signal value varies between H value being equal to or more than a predetermined threshold and L value being less than the predetermined threshold, and outputting it to the base terminal of the second switching element 143.

The control circuit 146 switches the signal value of the second control signal from L value to H value for each predetermined interval when a processing circuit to be described later instructs to emit by the light emitting device 122. The predetermined interval is set to an interval of imaging timing by the imaging device 117. On the other hand, the control circuit 146 switches the signal value of the second control signal from H value to L value when a second predetermined time has elapsed after switching the signal value of the second control signal from L value to H value. The second predetermined time is set to a time sufficiently shorter than the predetermined interval, and longer than a period in which the overcurrent flows when starting to flow the current to the constant current circuit 144.

Further, the control circuit 146 monitors the detection signal input from the detection circuit 145, after switching the signal value of the second control signal from L value to H value. The control circuit 146 switches the signal value of the first control signal from L value to H value when the signal value of the detection signal becomes a value indicating that the amount of the current supplied to the constant current circuit 144 is less than the threshold. On the other hand, the control circuit 146 switches the signal value of the first control signal from H value to L value when a first predetermined time has elapsed after switching the signal value of the first control signal from L value to H value. The first predetermined time is set to a time for turning on the light emitting element 141.

The control circuit 146 is, for example, AFE, ASIC, DSP, LSI, FPGA, etc., may be used as the control circuit 146.

The circuit of the red light emitting device 131*a* is not limited to that described above. For example, the light emitting element 141, the first switching element 142 and the constant current circuit 144 may be located in series in an arbitrary order.

The green light emitting device 132*a* and the blue light emitting device 133*a* of the first light emitting device 122*a*, and the red light emitting device 131*b*, the green light emitting device 132*b* and the blue light emitting device 133*b* of the second light emitting device 122*b* have a configuration similar to the red light emitting device 131*a* of the first light emitting device 122*a*. That is, the green light emitting device 132*a*, the blue light emitting device 133*a*, the red light emitting device 131*b*, the green light emitting device 132*b* and the blue light emitting device 133*b* includes a light emitting element, a first switching element, a second switching element, a constant current circuit, a control circuit and a detection circuit, respectively. However, the light emitting element of the red light emitting device 131*b* is a red LED, and emits red light to the conveyed medium. The light emitting elements of the green light emitting device 132*a* and the green light emitting device 132*b* are green LEDs, and emit green light to the conveyed medium. The light emitting elements of the blue light-emitting device 133*a* and the blue light-emitting device 133*b* are green LEDs, and emit blue light to the conveyed medium.

The control circuits of the red light emitting device 131*a*, the green light emitting device 132*a* and the blue light emitting device 133*a*, turn on the light emitting elements at timings different from each other. The red light emitting device 131*a* turns on the light emitting element when the first imaging sensor 123*a* generates the electric signal corresponding to the red component, and turns off the light emitting element at other timing. The green light emitting device 132*a* turns on the light emitting element when the first imaging sensor 123*a* generates the electric signal corresponding to the green component, and turns off the light emitting element at other timing. The blue light emitting device 133*a* turns on the light emitting element when the first imaging sensor 123*a* generates the electric signal corresponding to the blue component, and turns off the light emitting element at other timing.

Similarly, the control circuits of the red light emitting device 131*b*, the green light emitting device 132*b* and the blue light emitting device 133*b*, turn on the light emitting elements at timings different from each other. The red light emitting device 131*b* turns on the light emitting element when the second imaging sensor 123*b* generates the electric signal corresponding to the red component, and turns off the light emitting element at other timing. The green light emitting device 132*b* turns on the light emitting element when the second imaging sensor 123*b* generates the electric signal corresponding to the green component, and turns off the light emitting element at other timing. The blue light emitting device 133*b* turns on the light emitting element when the second imaging sensor 123*b* generates the electric signal corresponding to the blue component, and turns off the light emitting element at other timing.

Figure 5:
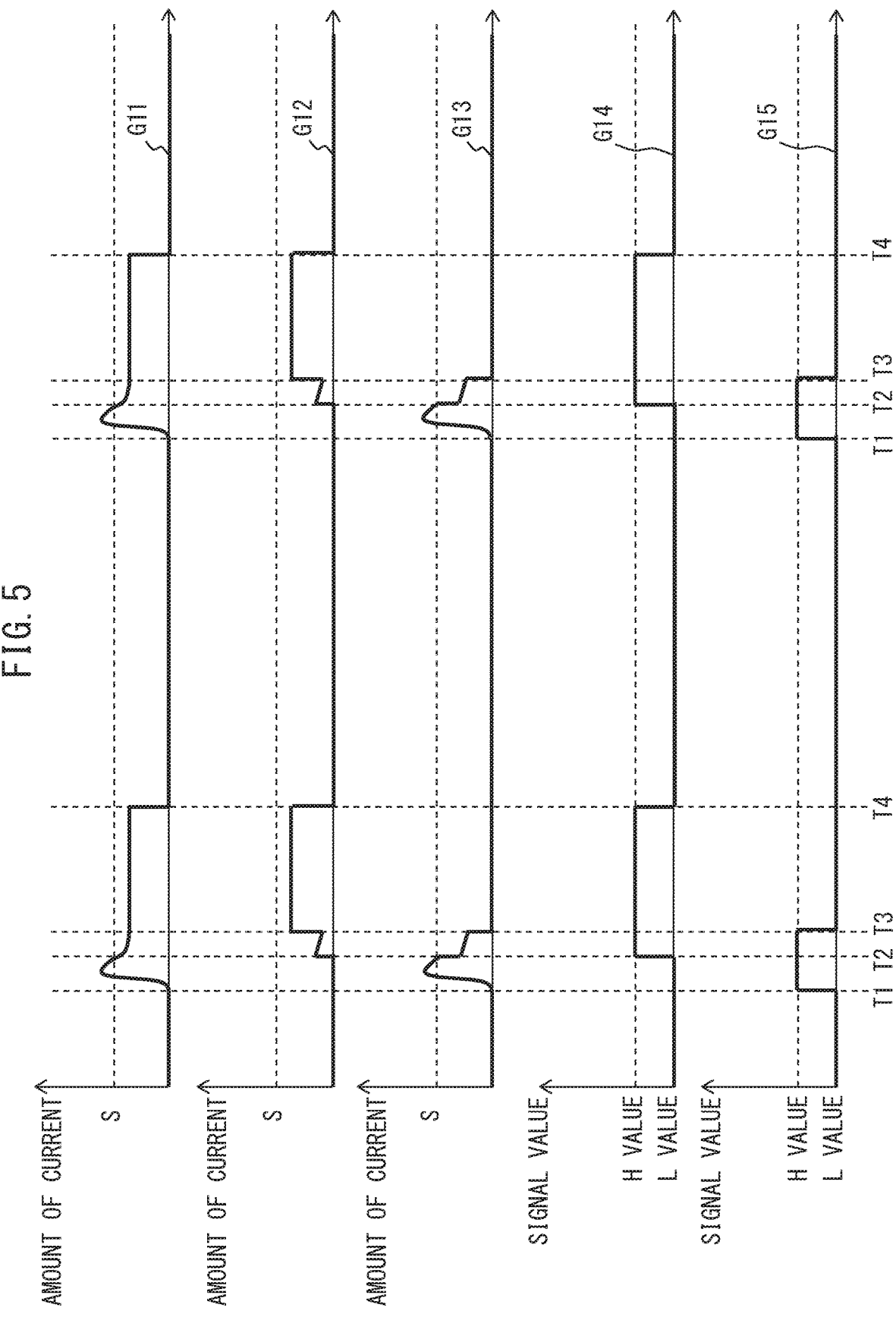
FIG. 5 is a graph for illustrating an amount of a current, etc.

FIG. 5 is a graph for illustrating the amount of the current in the red light emitting device 131a and the signal values of the first control signal and the second control signal.

In FIG. 5, graph G11 shows the amount of the current supplied to the constant current circuit 144, i.e. the total amount of the current of the first current and the second current. Graph G12 shows the current supplied from the power supply voltage Vcc to the constant current circuit 144 via the first switching element 142, i.e., the amount of the current of the first current supplied to the light emitting element 141. Graph G13 shows the amount of the current supplied from the power supply voltage Vcc to the constant current circuit 144 via the second switching element 143, i.e., the second current not supplied to the light emitting element 141. In graphs G11 to G13, the horizontal axes indicate the time, and the vertical axes indicate the amount of the current.

On the other hand, the graph G14 shows the signal value of the first control signal output from the control circuit 146 and input to the first switching element 142. Graph G15 shows the signal value of the second control signal output from the control circuit 146 and input to the second switching element 143. In graphs G14 to G15, the horizontal axes indicate the time, and the vertical axes indicate the signal value.

As shown in graphs G14, G15, before time T1, the signal value of the first control signal and the signal value and the second control signal is set to L value, and the first switching element 142 and the second switching element 143 is set to OFF. Thus, as shown in graphs G11 to G13, a sufficient amount of current is not supplied to the constant current circuit 144 and the light emitting element 141, and thereby, the light emitting element 141 is turned off.

As shown in graph G15, when turning on the light emitting element 141, the control circuit 146, first at time T1, switches the signal value of the second control signal from L value to H value, to switch the second switching element 143 from OFF to ON. Thus, as shown in graph G13, the second current is supplied from the power supply voltage Vcc to the constant current circuit 144 via the second switching element 143, and as shown in graph G1, the second current is supplied to the constant current circuit 144. When the second current starts flowing through the second switching element 143 and the constant current circuit 144, the overcurrent larger than the rated current S of the light emitting element 141 flows through them.

Thereafter, as shown in graph G13, at time T2, the amount of the second current supplied from the power supply voltage Vcc to the constant current circuit 144 via the second switching element 143 decreases to a predetermined value. As shown in graph G11, when the amount of the current supplied to the constant current circuit 144 becomes less than the rated current S of the light emitting element 141, the signal value of the detection signal generated by the detection circuit 145 indicates that the amount of the current supplied to the constant current circuit 144 is less than the threshold. Thus, as shown in graph G14, the control circuit 146 switches the signal value of the first control signal from L value to H value, to switch the first switching element 142 from OFF to ON. Thus, as shown in graph G12, the first current is supplied from the power supply voltage Vcc to the constant current circuit 144 via the first switching element 142, the first current is supplied to the light emitting element 141.

At this time, the second current has already been supplied to the constant current circuit 144 via the second switching element 143. Since the constant current circuit 144 controls the supplied current so that the total current amount does not exceed the rated current S, the amount of the first current supplied to the constant current circuit 144 via the first switching element 142 is smaller than the rated current S. Therefore, as shown in graph G12, at time T2, the amount of the first current supplied to the light emitting element 141 is smaller than the rated current S.

As shown in graph G15, at time T3 at which the second predetermined time has elapsed from time T1, the control circuit 146 switches the signal value of the second control signal from H value to L value, to switch the second switching element 143 from ON to OFF. Thus, as shown in graph G13, the amount of the second current supplied from the power supply voltage Vcc to the constant current circuit 144 via the second switching element 143 becomes 0. As shown in graph G1, the constant current circuit 144 controls the supplied current so that the total current amount does not exceed the rated current S. Therefore, as shown in graph G12, the amount of the first current supplied to the constant current circuit 144 via the first switching element 142 is smaller than the rated current S.

As shown in graph G14, at time T4 at which the first predetermined time has elapsed from time T2, the control circuit 146 switches the signal value of the first control signal from H value to L value, to switch the first switching element 142 from ON to OFF. Thus, as shown in graph G12, the amount of the first current supplied from the power supply voltage Vcc to the constant current circuit 144 via the first switching element 142 becomes 0, and as shown in graph G11, the amount of the first current supplied to the constant current circuit 144 becomes 0.

Thus, at the time of switching the first switching element 142 from OFF to ON, the control circuit 146 turns ON the first switching element 142 in a state of flowing the second current to the second switching element 143 by turning ON the second switching element 143. Further, after turning on the first switching element 142, the control circuit 146 flows the first current to the light emitting element 141 and the first switching element 142 by turning OFF the second switching element 143.

As described above, the overcurrent flows through the constant current circuit 144 when the current starts flowing through it. If the overcurrent flows through the constant current circuit 144 at the time of switching the first switching element 142 from OFF to ON, the current exceeding the rated current flows through the light emitting element 141. In that case, since the amount of the light of the light emitting element 141 is too large, the quality of the input image generated by the imaging sensor 123 may be reduced. Also, in that case, the light emitting element 141 may fail.

On the other hand, the control circuit 146 switches the second switching element 143 from OFF to ON before switching the first switching element 142 from OFF to ON. Thus, since the overcurrent occurring when the current starts flowing through the constant current circuit 144 flows through the second switching element 143 side, it is prevented that the overcurrent flows through the light emitting element 141. Therefore, the control circuit 146 can prevent the reduction in the quality of the input image generated by the imaging sensor 123, and the occurrence of the failure of the light emitting element 141. Further, the control circuit 146 switches the first switching element 142 from OFF to ON, before returning the second switching element 143 from ON to OFF. Thus, since the light emitting element 141 starts turning on early, the imaging sensor 123 can accumulate a sufficient amount of light in a short time. Therefore, the image reading apparatus 100 can image each line of the medium in a short time, and thereby, image the medium in a high-speed.

As described above, since the first current is not supplied to the light emitting element 141 between time T1 to time T2, and the amount of the first current supplied to the light emitting element 141 is smaller than the rated current S between time T2 and time T3, the amount of the light of the light emitting element 141 is reduced. However, the time from time T1 to time T2, and the time from time T2 to time T3 is sufficiently small as compared with the total light emission period of the light emitting element 141 (the time from time T1 to time T4). For example, when the light emission time of the light emitting element 141 is 50 μs, the time from time T2 to time T3 is 5% or less of the total light emission period. Therefore, the imaging sensor 123 can accumulate a sufficient amount of light as a total between time T1 and time T4.

Further, at the time of switching the first switching element 142 from OFF to ON, the control circuit 146 turns ON the first switching element 142 when the output current value of the constant current circuit 144 becomes less than the threshold since turning ON the second switching element 143. Thus, the control circuit 146 can more reliably prevent that the overcurrent flows through the light emitting element 141, and thereby, can more reliably prevent decrease of the quality of the image generated by the imaging sensor 123 and the occurrence of the failure of the light emitting element 141.

In each light emitting device, the detection circuit 145 may be omitted. In that case, at the time of switching the first switching element 142 from OFF to ON, the control circuit 146 turns ON the first switching element 142, after a third predetermined time has elapsed since turning ON the second switching element 143. The third predetermined time is set in advance to a time from when switching the second switching element 143 from OFF to ON to when the amount of the current in the constant current circuit 144 becomes less than the rated current of the light emitting element 141 or the first switching element 142. In that case, the control circuit 146 can turn on the light emitting element 141 at a higher speed, while preventing that the overcurrent flows through the light emitting element 141. Further, the control circuit 146 can suppress an increase in equipment cost, by omitting the detection circuit 145.

Figure 6:
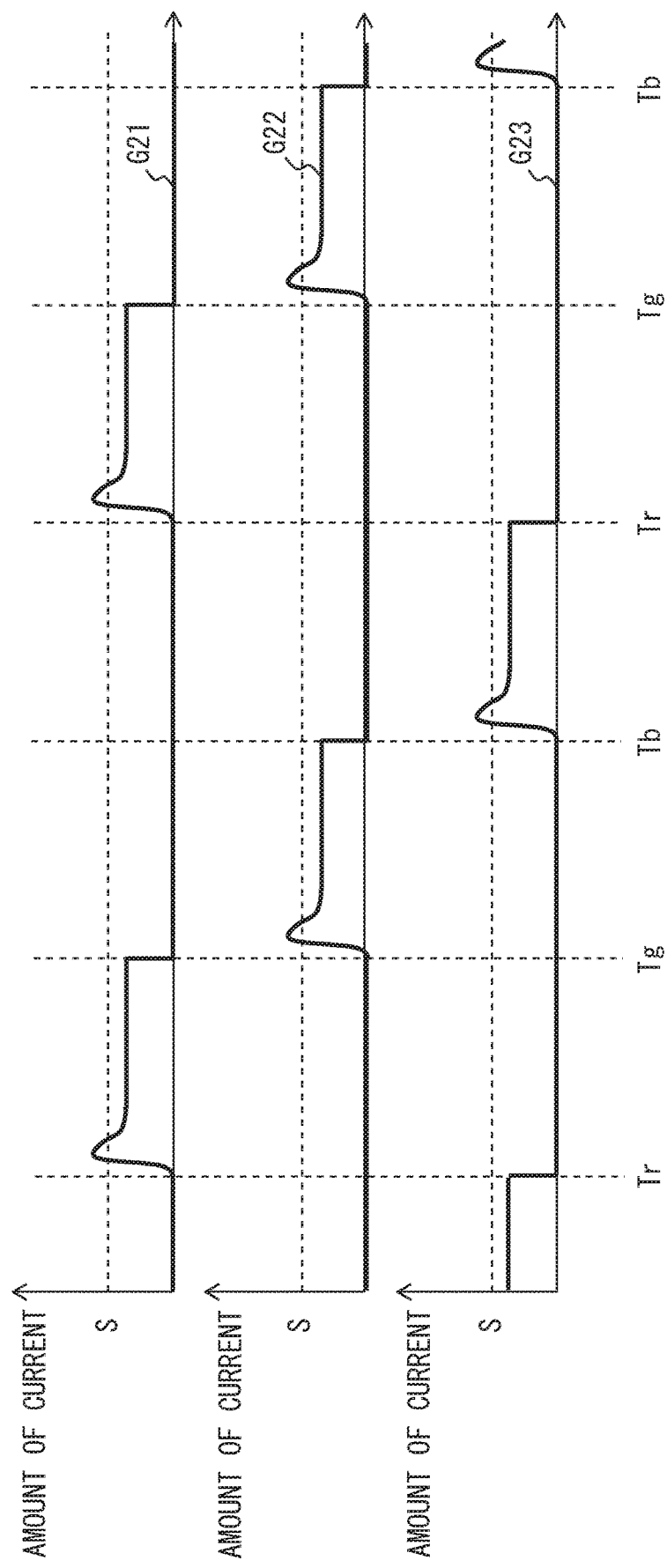
FIG. 6 is a graph for illustrating the amount of a current, etc.

FIG. 6 is a graph for illustrating the amount of the current in the red light emitting device 131a, the amount of the current in the green light emitting device 132a and the amount of the current in the blue light emitting device 133a.

In FIG. 6, graph G21 shows the amount of the current supplied to the constant current circuit of the red light emitting device 131a. Graph G22 shows the amount of the current supplied to the constant current circuit of the green light emitting device 132a. Graph G23 shows the amount of the current supplied to the constant current circuit of the blue light emitting device 133a. In graphs G21 to G23, The horizontal axes indicate the time, and the vertical axes indicate the amount of the current.

As shown in FIG. 6, the red light emitting device 131a switches the signal value of the second control signal from L value to H value to supply the current to the constant current circuit at time Tr, and turns on the light emitting element (red LED) from time Tr to time Tg. The green light emitting device 132a switches the signal value of the second control signal from L value to H value to supply the current to the constant current circuit at time Tg, and supplies the current to the constant current circuit to turn on the light emitting element (green LED) from time Tg to time Tb. The blue light emitting device 133a switches the signal value of the second control signal from L value to H value to supply the current to the constant current circuit at time Tb, and supplies the current to the constant current circuit to turn on the light emitting element (blue LED) from time Tb to time Tr.

That is, each control circuit of the red light emitting device 131a, the green light emitting device 132a and the blue light emitting device 133a supplies the current to each constant current circuit to turn on each light emitting element at the exclusive timing. Thus, the imaging sensor 123 can image the medium in which the light of each RGB color is emitted, to generate suitably the electrical signal corresponding to each color.

The control circuit of each light emitting device may supply the current to the constant current circuit by switching the signal value of the second control signal from L value to H value before time Tr, Tg, Tb, and supply the current to the constant current circuit by switching the signal value of the first control signal from L value to H value at time Tr, Tg, Tb. Thus, each light emitting device can continue to turn on each light emitting element for a longer period, and thereby, can suitably emit the light to the medium.

Figure 7:
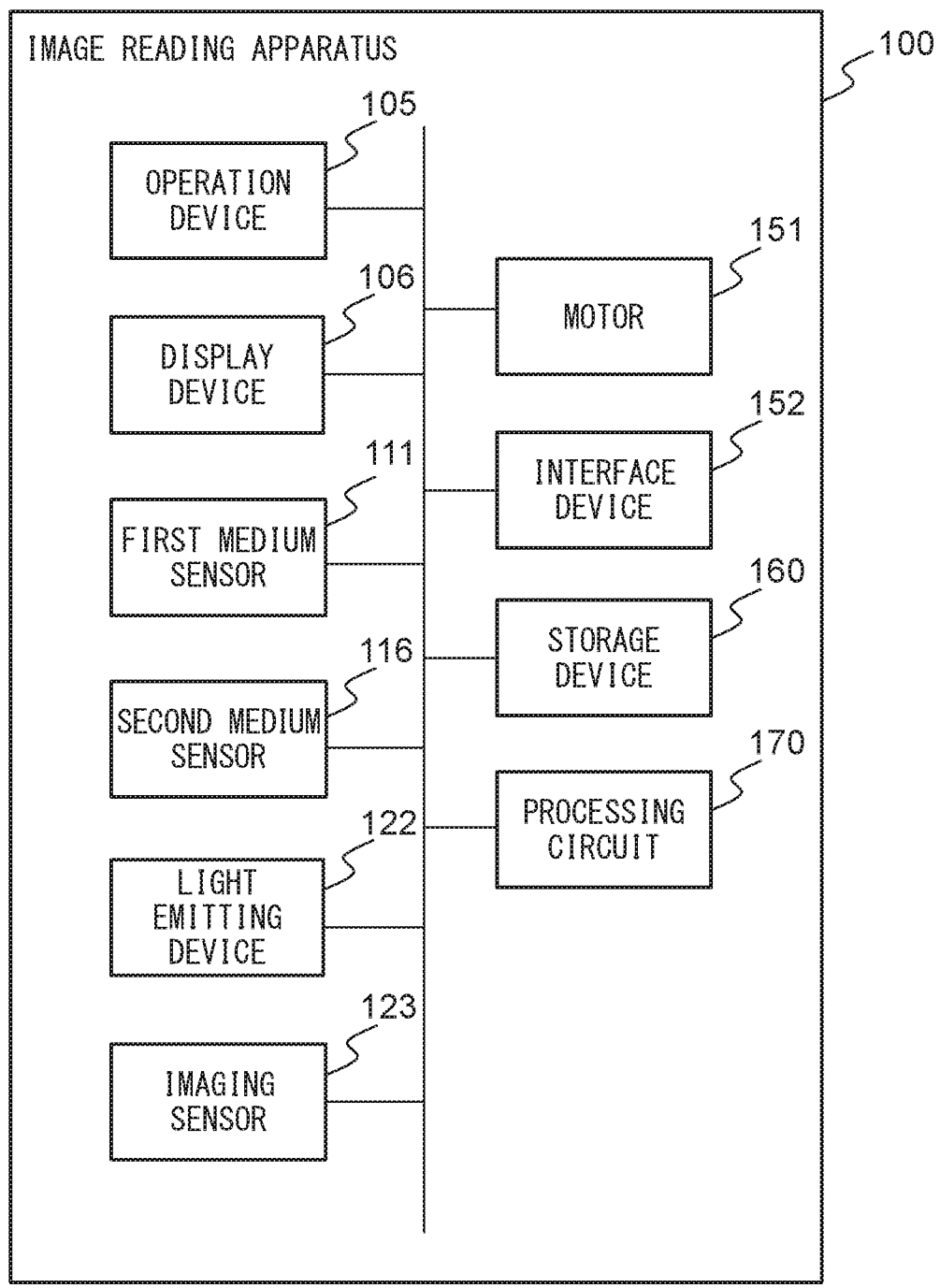
FIG. 7 is a block diagram illustrating a schematic configuration of the image reading apparatus 100.

FIG. 7 is a block diagram illustrating a schematic configuration of the image reading apparatus 100.

The image reading apparatus 100 further includes a motor 151, an interface device 152, a storage device 160, and a processing circuit 170, etc., in addition to the configuration described above.

The motor 151 includes one or more motors, and rotates the feed roller 112, the separation roller 113, the first conveyance roller 114, the second conveyance roller 115, the first ejection roller 118 and the second ejection roller 119, to convey the medium, by a control signal from the processing circuit 170. One roller of the first conveyance roller 114 and the second conveyance roller 115 may be a driven roller which is driven according to the rotation of the other roller. One roller of the first ejection roller 118 and the second ejection roller 119 may be a driven roller which is driven according to the rotation of the other roller.

For example, the interface device 152 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 152. For example, the predetermined communication protocol is a wireless local area network (LAN).

The storage device 160 includes a memory device such as a random access memory (RAM) or a read only memory (ROM), a fixed disk device such as a hard disk, or a portable storage device such as an optical disk. The storage device 160 stores computer programs, databases, tables, etc., used for various kinds of processing of the image processing apparatus 100. The computer program may be installed on the storage device 160 from a computer-readable, non-transitory medium such as a compact disc read only memory (CD-ROM), a digital versatile disc read only memory (DVD-ROM), etc., by using a well-known setup program, etc.

The processing circuit 170 operates in accordance with a program previously stored in the storage device 160. The processing circuit 170 is, for example, a central processing unit (CPU). The processing circuit 170 may be a DSP, LSI, ASIC, FPGA, etc.

The processing circuit 170 is connected to the operation device 105, the display device 106, the first medium sensor 111, the second medium sensor 116, the light emitting device 122, the imaging sensor 123, the motor 151, the interface device 152 and the storage device 160, etc., and controls each of these units. The processing circuit 170 performs drive control of the motor 151, emitting control of the light emitting device 122, imaging control of the imaging sensor 123, etc., acquires the input image, and transmits it to the information processing apparatus via the interface device 152.

Figure 8:
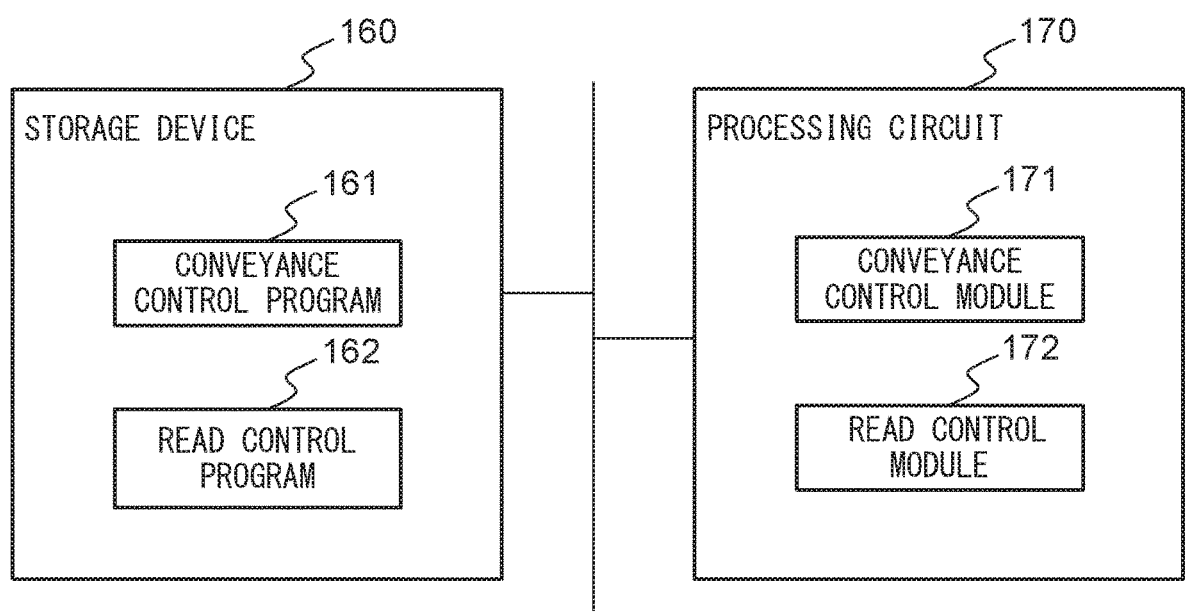
FIG. 8 is a diagram illustrating schematic configurations of the storage device 160 and the processing circuit 170.

FIG. 8 is a diagram illustrating schematic configurations of the storage device 160 and the processing circuit 170.

As shown in FIG. 8, the storage device 160 stores a conveyance control program 161 and a read control program 162, etc. Each of these programs is a functional module implemented by software operating on a processor. The processing circuit 170 reads each program stored in the storage device 160 and operates in accordance with each read program. Thus, the processing circuit 170 functions as a conveyance control module 171 and a read control module 172.

Figure 9:
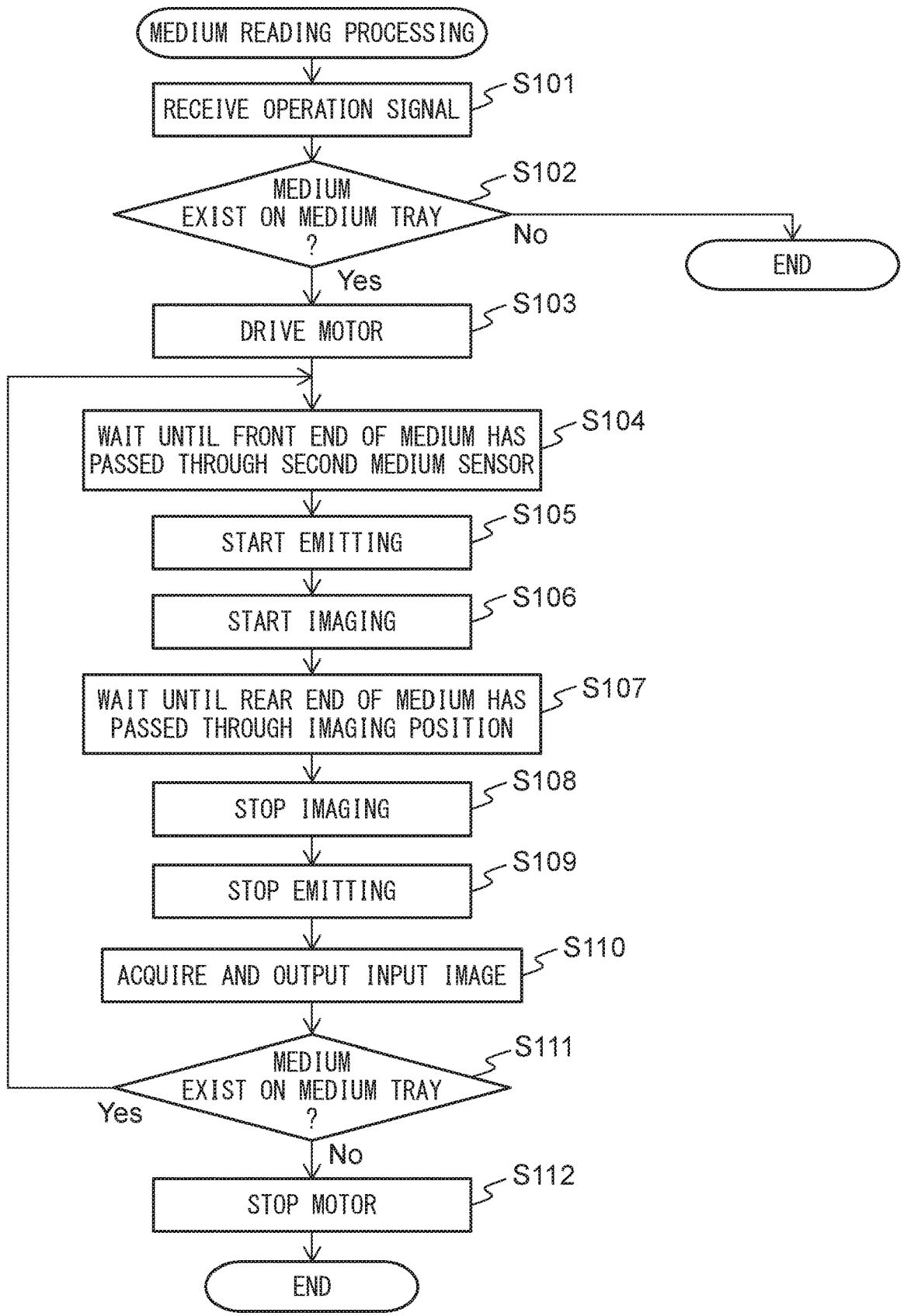
FIG. 9 is a flowchart illustrating an operation example of a medium reading process.

FIG. 9 is a flowchart illustrating an operation example of a medium reading process of the image reading apparatus 100.

Referring to the flowchart illustrated in FIG. 9, the operation example of the medium reading processing in the image reading apparatus 100 will be described below. The operation flow described below is executed mainly by the processing circuit 170 in cooperation with each element in the image reading apparatus 100, in accordance with a program previously stored in the storage device 160.

First, the conveyance control module 171 stands by until an instruction to read a medium is input by a user by use of the operation device 105, and an operation signal instructing to read the medium is received from the operation device 105 (step S101).

Next, the conveyance control module 171 acquires the first medium signal from the first medium sensor 111, and determines whether or not the medium is placed on the medium tray 103 based on the acquired first medium signal (step S102). When the medium is not placed on the medium tray 103, the conveyance control module 171 ends the series of steps.

On the other hand, when the medium is placed on the medium tray 103, the conveyance control module 171 drives the motor 151. The conveyance control module 171 rotates the feed roller 112, the separation roller 113, the first conveyance roller 114, the second conveyance roller 115, the first ejection roller 118 and/or the second ejection roller 119, to convey the medium (step S103).

Next, the read control module 172 waits until a front end of the medium passes through a position of the second medium sensor 116 (step S104). The read control module 172 acquires the second medium signal periodically from the second medium sensor 116, and determines that the front end of the medium passed through the position of the second medium sensor 116 when a signal value of the second medium signal changes from a value indicating that a medium does not exist to a value indicating that a medium exists.

Next, the read control module 172 controls the control circuits of the light emitting device 122, and starts emitting the light (step S105).

Next, the read control module 172 causes the imaging sensor 123 to start imaging (step S106).

Next, the read control module 172 waits until a rear end of the medium passes through an imaging position of the imaging device 117 (step S107). The read control module 172 acquires the second medium signal periodically from the second medium sensor 116, and determines that the rear end of the medium has passed through the position of the second medium sensor 116 when the signal value of the second medium signal changes from a value indicating that a medium exists to a value indicating that a medium does not exist. The read control module 172 determines that the rear end of the medium has passed through the imaging position of the imaging device 117 when a fourth predetermined time has elapsed since the rear end of the medium passes through the position of the second medium sensor 116. The fourth predetermined time is set to a time acquired by adding a margin to the time required for the medium to move from the position of the second medium sensor 116 to the imaging position.

Next, the read control module 172 causes the imaging sensor 123 to stop imaging (step S108).

Next, the read control module 172 controls the light emitting device 122, and stops emitting the light by respective control circuits (step S109).

Next, the read control module 172 acquires the input image from the imaging sensor 123, and outputs the acquired input image by transmitting it to the information processing device via the interface device 152 (step S110).

Next, the conveyance control module 171 determines whether or not the medium remains on the medium tray 103 based on the first medium signal acquired from the first medium sensor 111 (step S111). When the medium remains on the medium tray 103, the read control module 172 returns the process to step S104 and repeats the processes in steps S104 to S111.

On the other hand, when a medium does not remain on the medium tray 103, the conveyance control module 171 stops the motor 151 (step S112), and ends the series of steps.

As described in detail above, the light emitting device 122 is provided with the current path between the constant current circuit 144 and the light emitting element 141, and another current path in parallel with the current path between the constant current circuit 144 and the light emitting element 141, and flows the current to another current path before starting flowing the current to the light emitting element 141. Thus, the light emitting device 122 prevents the overcurrent caused by the constant current circuit 144 from flowing through the light emitting element 141. The light emitting device 122 also starts flowing the current to the light emitting element 141 before setting the amount of the current supplied to another current path to zero. Thus, the light emitting device 122 can turn on the light emitting element 141 early. Therefore, the light emitting device 122 can turn on the light emitting element 141 at a higher speed, while preventing that the overcurrent flows through the light emitting element 141.

In particular, the light emitting device 122 does not need to synchronize ON/OFF switching timing of the first switching element 142 and the second switching element 143, and thereby, can easily design ON/OFF switching timing. Thus, the light emitting device 122 can prevent the overcurrent from flowing through the light emitting element 141 and turn on the light emitting element 141 at a high speed, while suppressing an increase in development cost.

Furthermore, a light emitting device can prevent the overcurrent from flowing through a light emitting element, by connecting a resistor and a capacitor between a control circuit and a first switching element, to decrease a speed at which a first switching element changes from OFF to ON. However, in that case, it takes a long time for a constant current to be supplied to the light emitting element, and the light emitting device may not be able to emit the light having amount required by an image reading apparatus. The light emitting device 122 can prevent that the overcurrent to the light emitting element 141 flows, without connecting a capacitor between the control circuit 146 and the first switching element 142, and thereby, can emit a sufficient amount of light to the light emitting element 141.

Further, a light emitting device can prevent the overcurrent from flowing through the light emitting element, by using a constant current circuit of which a response speed is high (fast). However, in that case, the component cost of the constant current circuit is increased, and the power consumption is increased. The light emitting device 122 switches ON/OFF of the light emitting element 141 at a high speed, using the constant current circuit 144 of which a response speed is normal, which is inexpensive. Therefore, the light emitting device 122 can prevent the overcurrent from flowing through the light emitting element 141 and turn on the light emitting element 141 at a high speed, while suppressing an increase in device cost and power consumption.

Figure 10:
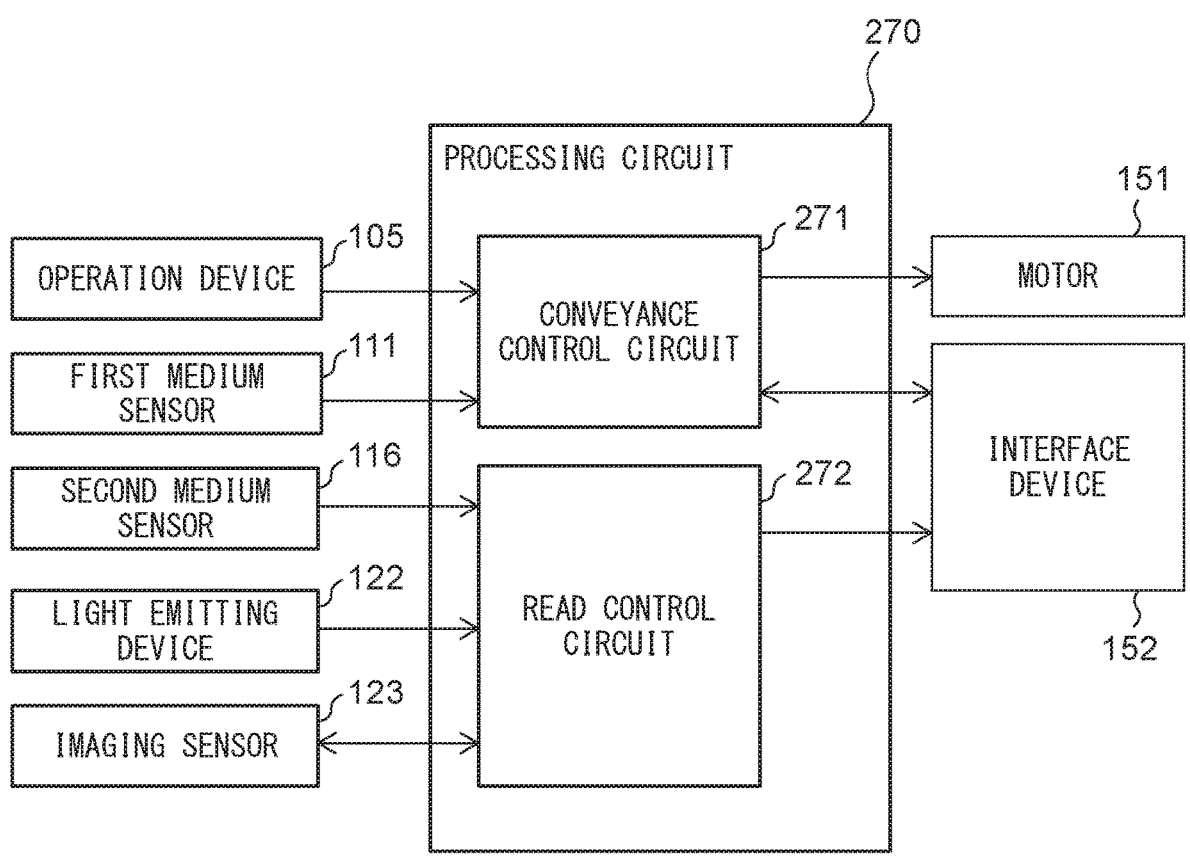
FIG. 10 is a diagram illustrating a schematic configuration of another processing circuit 270.

FIG. 10 is a diagram illustrating a schematic configuration of a processing circuit 270 in an image reading apparatus according to another embodiment. The processing circuit 270 is used in place of the processing circuit 170 of the image reading apparatus 100 and executes the medium reading process, etc., instead of the processing circuit 170. The processing circuit 270 includes a conveyance control circuit 271 and a read control circuit 272. Note that each unit may be configured by an independent integrated circuit, a microprocessor, firmware, etc.

The conveyance control circuit 271 is an example of a conveyance control module, and has a function similar to the conveyance control module 171. The conveyance control circuit 271 receives the operation signal from the operation device 105 or the interface device 152 and the first medium signal from the first medium sensor 111, and drives the motor 151 in response to each received signal.

The read control circuit 272 is an example of a read control module and has a function similar to the read control module 172. The read control circuit 272 receives the second medium signal from the second medium sensor 116, and controls the light emitting device 122 and the imaging sensor 123 based on the received second medium signal. The read control circuit 272 receives the input image from the imaging sensor 123, and transmits it to the information processing apparatus via the interface device 152.

As described in detail above, the image reading apparatus can turn on the light emitting element 141 at a higher speed, while preventing that the overcurrent flows through the light emitting element 141, even when the processing circuit 270 is used.

The image reading apparatus is not limited to the medium conveying apparatus to image the medium while conveying it, but may be a so-called flatbed type image reading apparatus to image the medium placed on a glass surface while moving the imaging device 117. In that case, the imaging sensor images the medium placed on the glass surface, and the light emitting devices emit light having different colors to the medium placed on the glass surface, respectively.

Further, the light emitting device 122 may be used in any device other than the image reading apparatus.

The light emitting element driving device and the image reading apparatus according to the embodiment can turn on the light emitting element at a higher speed, while preventing that the overcurrent flows through the light emitting element.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A light emitting driving device comprising:
a light emitting device to emit light in response to a supply of a first current;
a first switch to turn ON/OFF the first current supplied to the light emitting device;
a second switch to turn ON/OFF a second current not supplied to the light emitting device;
a constant current circuit to adjust a total current amount of the first current and the second current to be constant; and
a control circuit to control turning ON/OFF by the first switch and the second switch, wherein
the control circuit turns ON the first switch in a state of flowing the second current to the second switch by turning ON the second switch, and after turning ON the first switch flows the first current to the light emitting device and the first switch by turning OFF the second switch.

2. The light emitting driving device according to claim 1, wherein the control circuit turns ON the first switch, after a predetermined time has elapsed since turning ON the second switch.

3. The light emitting driving device according to claim 1, wherein the control circuit turns ON the first switch when an output current value of the constant current circuit becomes less than a threshold since turning ON the second switch.

4. An image reading apparatus comprising:
an imaging sensor to image a medium; and
a plurality of light emitting devices to emit light having different colors to the medium, respectively, wherein
each of the plurality of light emitting devices includes
a light emitting portion to emit light in response to a supply of a first current,
a first switch to turn ON/OFF the first current supplied to the light emitting portion,
a second switch to turn ON/OFF a second current not supplied to the light emitting portion,
a constant current circuit to adjust a total current amount of the first current and the second current to be constant, and
a control circuit to control turning ON/OFF by the first switch and the second switch, and wherein the control circuit turns ON the first switch in a state of flowing the second current to the second switch by turning ON the second switch, and after turning ON the first switch, flows the first current to the light emitting portion and the first switch by turning OFF the second switch.

5. The image reading apparatus according to claim 4, wherein the control circuit turns ON the first switch, after a predetermined time has elapsed since turning ON the second switch.

6. The image reading apparatus according to claim 4, wherein the control circuit turns ON the first switch when an output current value of the constant current circuit becomes less than a threshold since turning ON the second switch.

* * * * *